May 29, 1928. Re. 16,981

H. R. WARREN

METHOD AND APPARATUS FOR CLEANING, SEPARATING, AND GRADING SEEDS AND OTHER BODIES

Original Filed May 27, 1921 4 Sheets-Sheet 1

Inventor
Harry R. Warren
Cameron Kerkam & Sutton
Attorneys

May 29, 1928. Re. 16,981
H. R. WARREN
METHOD AND APPARATUS FOR CLEANING, SEPARATING, AND GRADING SEEDS AND OTHER BODIES
Original Filed May 27, 1921 4 Sheets-Sheet 2
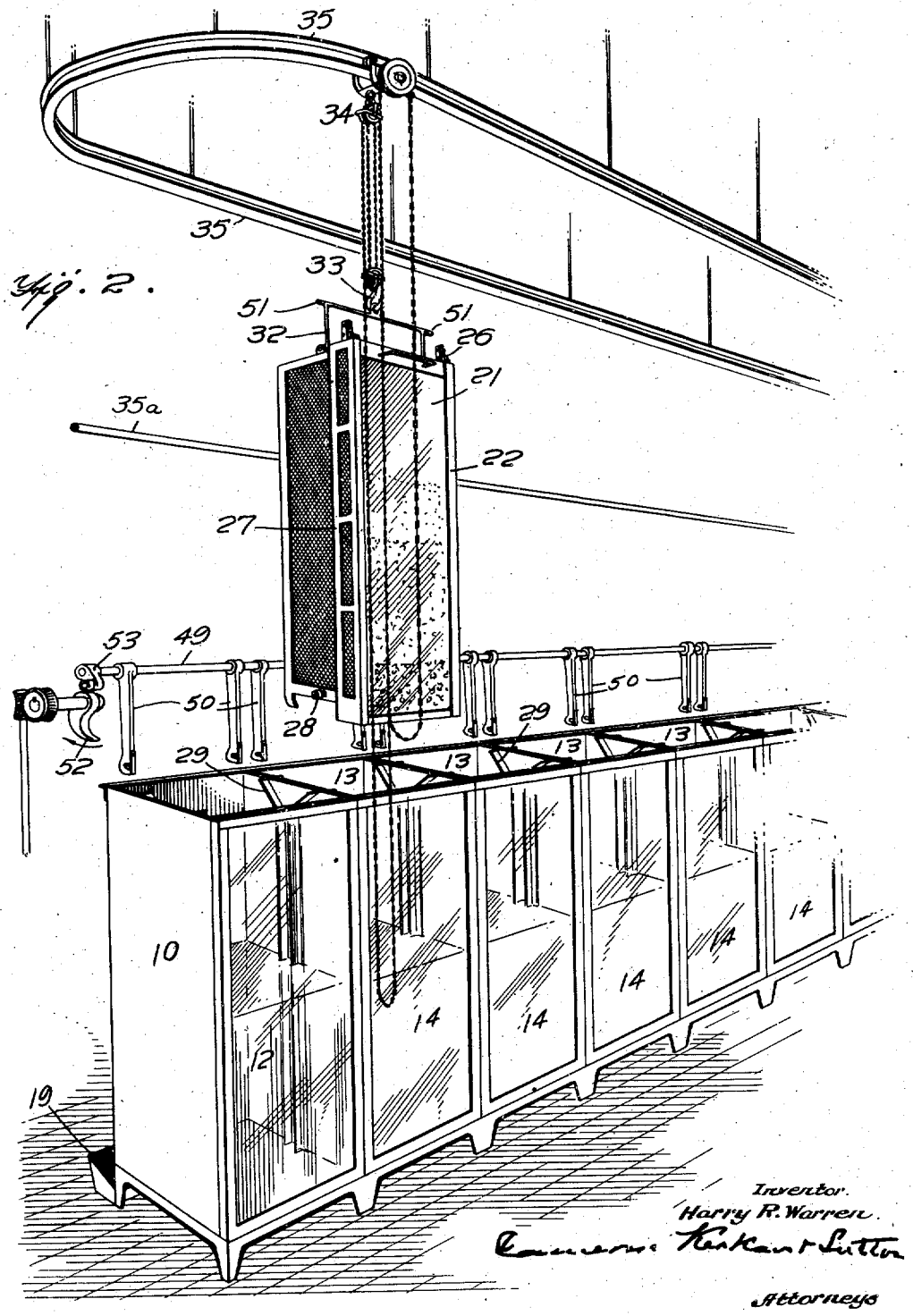

May 29, 1928. Re. 16,981
H. R. WARREN
METHOD AND APPARATUS FOR CLEANING, SEPARATING, AND GRADING SEEDS AND OTHER BODIES
Original Filed May 27, 1921 4 Sheets-Sheet 3
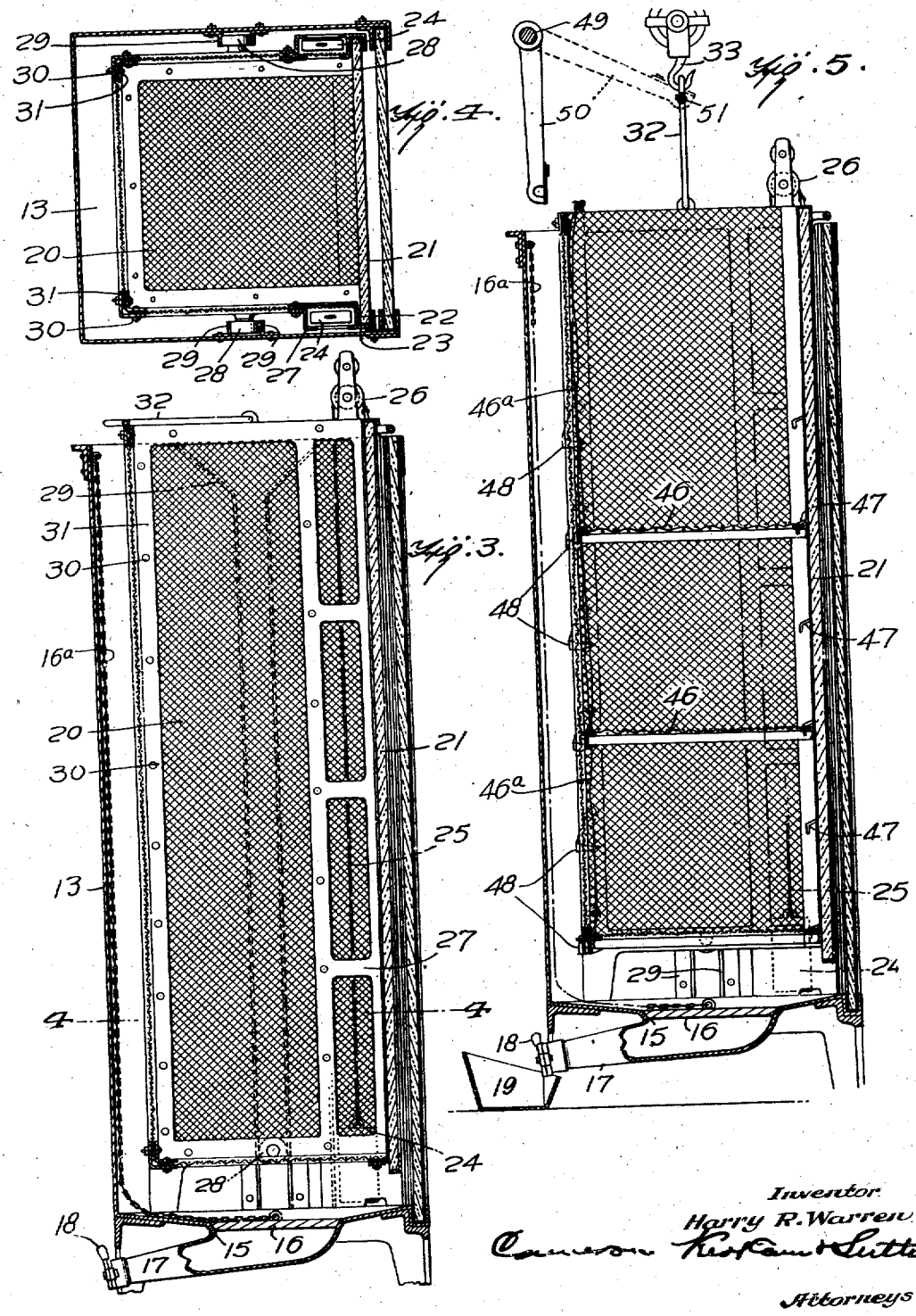
Inventor
Harry R. Warren
Cameron Kerr Sutton
Attorneys May 29, 1928. Re. 16,981
H. R. WARREN
METHOD AND APPARATUS FOR CLEANING, SEPARATING, AND GRADING SEEDS AND OTHER BODIES
Original Filed May 27, 1921 4 Sheets-Sheet
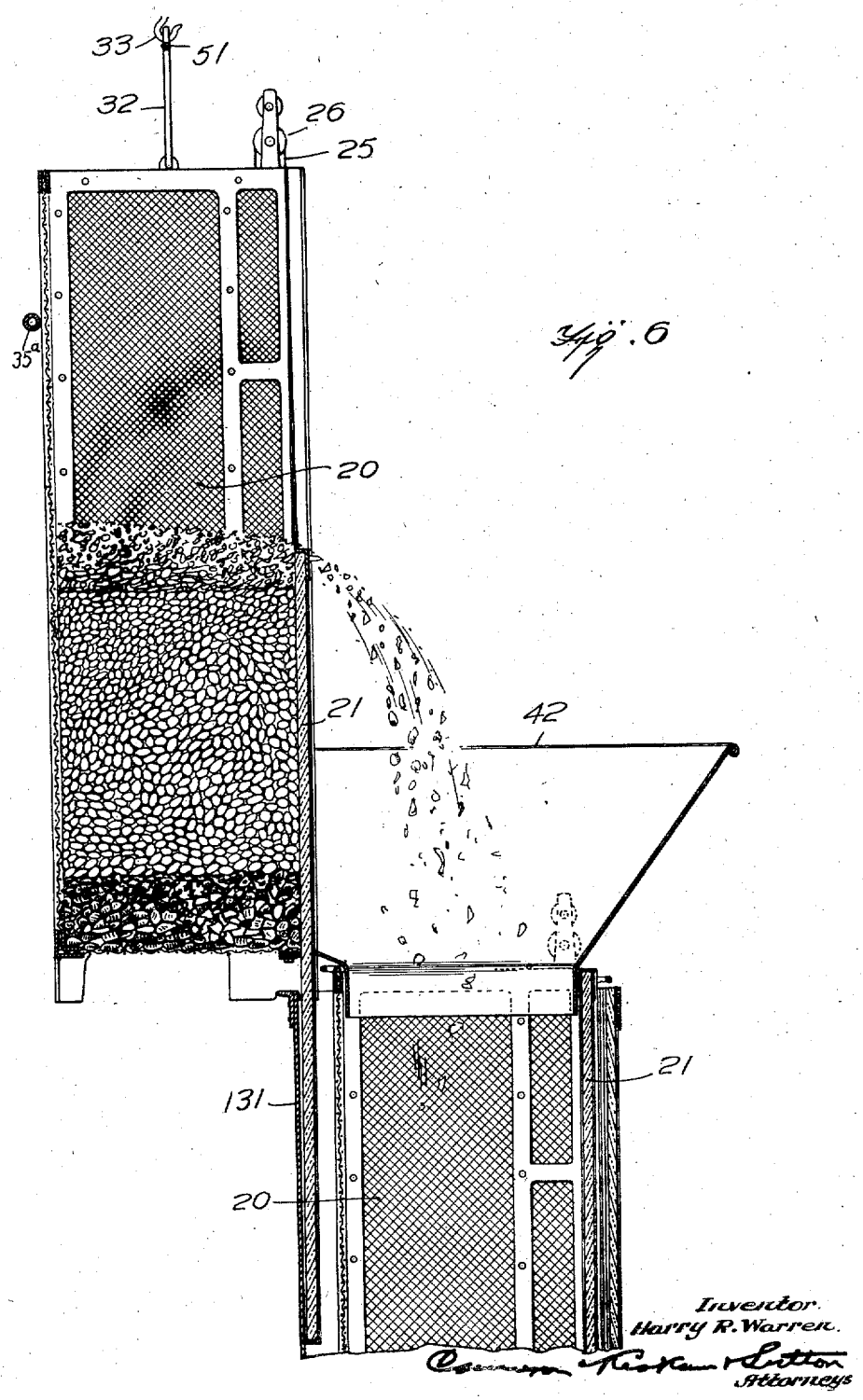

Reissued May 29, 1928. Re. 16,981

UNITED STATES PATENT OFFICE.

HARRY R. WARREN, OF CHICAGO, ILLINOIS, ASSIGNOR TO WARREN SEED CLEANING COMPANY, OF RENO, NEVADA, A CORPORATION OF NEVADA.

METHOD AND APPARATUS FOR CLEANING, SEPARATING, AND GRADING SEEDS AND OTHER BODIES.

Original No. 1,572,055, dated February 9, 1926, Serial No. 472,974, filed May 27, 1921. Renewed May 14, 1925. Application for reissue filed February 4, 1928. Serial No. 252,012.

Speaking from a practical experience of many years as a seed producer on a large scale in which I have made use of the best appliances on the market available for cleaning and separating seed, it is impossible by such appliances known to me to get results which do not involve serious waste and loss of seeds of value which must be treated as mere tailings or screenings because of their unsalvable mixture with a large percentage of noxious seeds, and which even when the percentage of objectionable seeds is sufficiently small to comply with the pure seed laws which exist in nearly all States, are a serious menace from the propagation of baneful growths which is inevitable from the planting of even the few noxious seeds present in the proportion permitted by the pure seed laws. This inadequacy of separation of noxious from good seeds is reflected in the pure seed laws which, placing the standard of purity as high as possible without being prohibitive of dealing in seeds (and thus suicidally making it impossible for the farmer to obtain seeds), dare not, in the most exacting States, require a higher percentage of purity than from 90 to 97%. In some States a percentage of purity as low as 90% is permitted. Obviously the waste in good seeds and the loss from the damage caused by weed pests are enormous. The object of my invention is to eliminate this loss. My invention is the outcome of thorough investigation of the methods and appliances commonly used for seed separation and of the problems that the great diversities in seeds present. By my invention perfect salvage or separation can be effected, and by means of apparatus of simple and not costly construction, and of such rapid performance of the operations required as to be quite inexpensive. My invention is based on the familiar fact that bodies of different specific gravities, when placed in a liquid, will settle or float therein at different levels, and while I am aware that it has been proposed to utilize this principle in the separation of seeds, I do not know that it has been done in actual practice, or on a commercial scale, and I am convinced from my practically ascertained knowledge of the subject that unless characteristics which differentiate my method and apparatus from what has been heretofore proposed are utilized, it is impossible to employ such principle in a truly practical way.

The problem of seed separation by floatation is rendered difficult because seeds in the same mixture will differ but very little in specific gravity. A liquid such as normal water is not efficient in most cases. A heavier or denser liquid must be used, but that brings the liquid and seeds, or some of them, to so near a like specific gravity that anything that will cause movement or disturbance of the liquid will have a turbulent effect on the seeds and result in again mixing them, if they have separated into different strata or levels. Devices, therefore, intended for the removal of the sorted seeds from the liquid after the stratification has taken place, that cause any agitation or movement of the liquid, undo, in part at least, the separation that may have been produced. Other difficulties that may be named are the effects that liquids, such as plain water and aqueous solutions may have on the seed. Thus salt (sodium chloride) in the water to add to its density sterilizes some seeds, and any undue saturation of seeds may be objectionable. It is therefore evident that the efficient, safe, and otherwise satisfactory separation of seeds in a mixture of assorted seeds, chaff, dirt, etc., calls for the solution of various problems.

In the drawings:

Fig. 2 is a perspective view of a portion thereof drawn on a larger scale showing a mixture holding receptacle elevated above the liquid tank;

Fig. 3 is a vertical section on the line 3—3 of Fig. 1, but with a basket and contents submerged;

Fig. 4 is a horizontal section on the line 4—4 of Fig. 3;

Fig. 5 is a view like Fig. 3 of a form of my invention suitable for cleaning and grading potatoes;

Fig. 6 is a vertical section illustrating the operation of removing a strata or layer from a basket.

Figure 1:
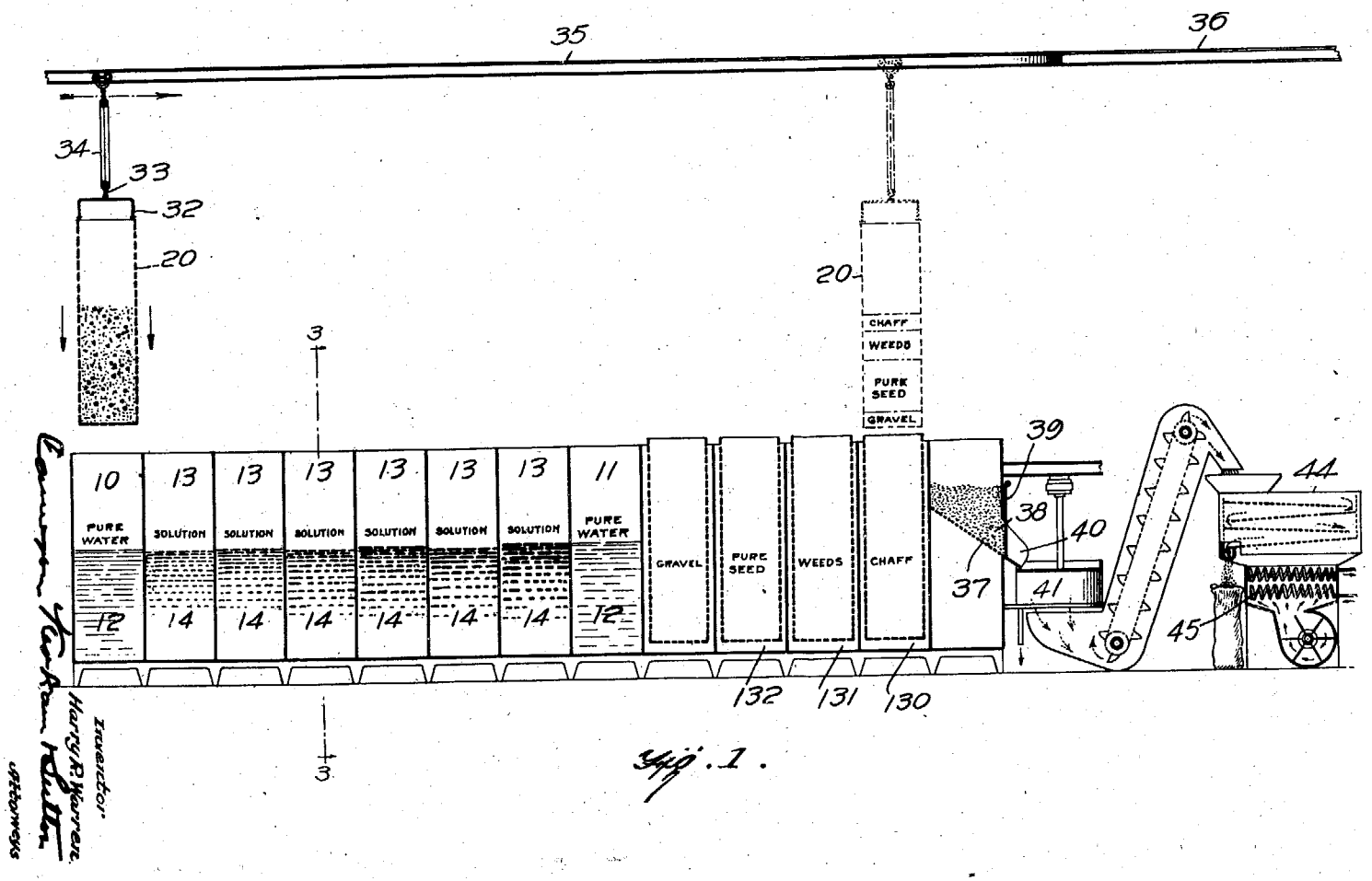
Fig. 1 is a front elevation of apparatus which may be used to practice the method or process I have invented and which has a construction that embodies my invention regarded as an apparatus.

My invention, both as to method or process and apparatus, may be carried out or practiced by means or apparatus differing widely in structure and arrangement from that shown in the drawings, and hence the scope of my invention is not to be confined to what is illustrated, and which I describe hereinafter, but extends to what is defined by or embraced within the scope of the appended claims.

Generally describing the apparatus shown in the drawings, it embodies a series of similar or substantially similar tanks arranged side by side, thirteen in number, some of which contain a liquid, pure water in two cases, in the others, preferably a solution of sugar, and the respective solutions being of graduated density, and a number of similar receptacles which for convenience of description, I will call baskets, because they, or any one of them, receives and holds and is a carrier for the mixture to be classified or separated, each of which is capable of descent into and removal from any one of the tanks, (except the last one of the series), and of movement from one to another of the series, an overhead trolley type raising and lowering device being provided for such handling of said baskets.

Proceeding now with a detail description of the apparatus shown, each of twelve of the tanks is rectangular in horizontal section, (though, of course, it could be round or any other shape), closed at bottom and on all four sides, but open at the top, and capable of holding liquid, the first tank, 10, and the eighth, 11, of the series containing pure water, 12, and the intervening tanks, 13, containing a sugar, glucose or other gravity solution, 14, varying in density say from a proportion of one part of sugar to from four to twelve parts of water to one of two parts of sugar to one of water. The bottom of the tank has at the center an outlet opening, 15, normally closed by a cover, 16, through which, when the cover is lifted, sedimentary matter may pass into an outlet pipe, 17, having a discharge end that is closed by a plug or valve, 18, and which overhangs a gutter, 19. A chain 16[a], is attached to the cover to lift it.

Each basket, 20, has a form corresponding to that of the tanks, but sufficiently smaller, horizontally, to allow it to be easily lowered into and lifted from a tank, its bottom and three of its side walls being perforated for the flow of liquid therethrough, while its fourth wall, 21, is of glass in a frame, 22, and slidable vertically at opposite edges in guides, 23, for a purpose explained hereinafter. One of the walls of each tank is also glass and the glass walls of the two being opposite in the use of the apparatus, the contents of the basket are visible to the operator, and he can thus observe what is going on therein. The slidable wall, 21, is counterbalanced, as by a weight, 24, on each side, suspended by a chain or cord, 25, attached to the wall at the top, and passing over a pulley, 26. Thus, the slidable wall is held in its normally raised position, and at whatever other levels to which it may be moved, and but little effort is required to move it vertically. Each weight is confined in a vertical pocket or guideway, 27, on the adjacent side wall of the basket.

Suitable guiding means are provided for the basket in its vertical movement in a tank. For this purpose, as shown, a roller, 28, is provided on the outside of each of two opposite side walls of the basket, which passes between spaced vertical ribs, 29, on the adjacent tank wall, and the upper ends of said ribs, 29, diverge for the ready entrance of the appropriate roller, 28.

Preferably, the bottom of the basket (see Fig. 5) is hinged so that at will, it may be swung downward to empty the basket contents.

The perforated side walls of the basket are preferably made of wire cloth, each side consisting of a sheet of such cloth attached to a frame, and the latter is removably secured, as by bolts, 30, to bars, 31, that form the basket frame, so that ready and inexpensive repair by replacement of damaged cloth may be made.

Each basket, at its top, has a hinged bail or handle, 32, by which it may conveniently be suspended from the hook, 33, of a trolley block-and-tackle type of hoist, 34, suspended from an overhead track, 35, with its two rails parallel with the row or series of tanks, and connected at the ends so that a hoist with a suspended basket may make the complete circuit. Inasmuch as a number of baskets may be suspended at a time, available for use in succession the track may have an extension, 36, controlled by a switch, on which the baskets may be run. The hoist, 34, is of a construction having a device to retain the basket in an elevated position. The raised basket rests against a horizontal bar, 35[a].

The last tank of the series is intended temporarily to receive the completed product, and it therefore has near mid-height an inclined platform, 37, of wire cloth, or otherwise perforated to permit the drainage of liquid from seeds or other articles delivered to said tank. At the lower end of said platform, 37, the tank wall has an opening, 38, closed by a suitable door, 39, from which leads a chute, 40, that delivers the still partially moist product to a suitable drier, preferably a centrifugal drier, 41, of well-known construction. From the latter the product is removed for further treatment such as grading for size, if necessary, or for storage in bins. For grading and further drying a machine, 44, of the vibrating or shaking screen type may be employed into which is introduced heated air from a suitable heater, 45.

I, of course, do not restrict myself to any particular dimensions, or forms of members or parts, but it will aid to an understanding and appreciation of the working capacity of apparatus embodying my invention to say that with thirteen tanks, each two feet square and about five feet high, three men working ten hours a day can handle a car load of mixed seed.

Describing the procedure pursued and the manipulation necessary in the case of the apparatus shown in the drawings, a mixture of seed, containing, say, six varieties (that number being an average) and dirt and gravel, the proper quantity is loaded into one of the baskets which for loading it is brought by its traveling hoist to a loading stand or station adjacent the first tank of the series. Such basket is then transported to a position above the first tank, which contains clear water, and is lowered therein for the purpose of washing the seed. The basket is then lifted out of the washing tank and is carried to a position above that one of the tanks which contains the liquid of the density which test has shown to be best suited to the mixture being operated on, say that in the first tank, 13, and then lowered into the liquid in that tank until its contents are completely enveloped by the liquid. By reason of the slight wetting which the seeds, etc., received from the washing in the first tank they will readily descend into the liquid in tank, 13, and not tend to stop and accumulate on the surface of such liquid. The various elements in the mixture will arrange themselves in the liquid at different levels according to their respective gravities, the heaviest, of course, being lowest, the heaviest being dirt, gravel, etc., and the lightest, being chaff and defective seed, being at the top. If need be, to hasten gravitation to the proper level, the basket may be moved up and down in a succession of short, jerky motions, which can be done with little effort because of the buoyant effect of the enveloping liquid. Gravity separation having proceeded as far as possible, which the operator can determine by observation through the glass walls, the basket is next lifted out of the tank, 13, and the liquid therein, the liquid within the basket during the ascent, flowing freely out through the perforated bottom and side walls of the basket, and by the time the basket completely emerges from the liquid, the contents will be supported in a solid mass on the basket bottom, but in layers or strata exactly corresponding with the disposition effected by the liquid, for no mingling or confusion results, or can result, from the mere lifting operation. The basket is now transported by its trolley-supported hoist to a position above a tank, 130, in which has previously been placed another empty one of the baskets, and then the slidable front wall of the loaded basket is lowered to a level to uncover the chaff and other light waste material at the top so that it can be raked or pulled off and allowed to fall into said empty basket in tank, 130, a funnel, 42, being applied to the top of the empty tank to catch and direct the falling material. To hold the loaded basket in position during this operation, the lower end of the front wall is inserted in the space between the back wall of tank, 130, and the back wall of the empty basket therein. The removal of the chaff being accomplished, the front wall of the loaded basket is again raised, and if necessary to effect more perfect separation of the bodies in the basket, the latter may be returned for submersion and agitation in the denser liquid of the third, or other tank, following which the basket, with its still stratified contents, is carried to a point above tank, 131, which also contains an empty basket into which the layer above the pure seed is emptied, the funnel, 42, being used in that operation, which is performed in like manner to that described in connection with the removal of the chaff, etc. Next, the basket is transported to the tank, 132, containing an empty basket, and the slidable front wall being lowered to the proper level, the seed is raked or pulled out of the basket, and delivered to such empty basket, and that having been accomplished the front wall is slid up to closing position, and the basket removed from such tank and placed above an adjoining tank for the removal to the basket therein of the gravel, dirt, etc., still remaining.

Later, if further treatment of the seed deposited in the basket of tank, 132, is thought necessary to further classify it, that will be done by manipulating the basket containing the same as hereinbefore described in connection with one of the solution-containing tanks; and in like manner the contents of the baskets of tanks, 130 and 131, may be again subjected to such classifying treatment, the perfectly purified product of the various treatments being finally delivered to the last tank for transferring to the centrifugal drier.

When a sufficient quantity of pure seed accumulates in the basket of tank, 132, such basket is transported to the tank, 11, and lowered into the pure water therein to wash or rinse off the sugar or other material taken up from the previously used solutions, to salvage the same for reuse in the solution tanks, and thus no loss, or a minimum of loss of such material, is sustained. Likewise the basket containing straw or other waste and that containing gravel are dipped in the rinsing water of tank, 11, to salvage the material that may adhere to such waste material, and that having been accomplished the chaff, gravel, etc., are carried to the waste dump.

I use sugar or glucose as the means for increasing the density of water for separation or classifying purposes because in the case of seeds such saccharine solutions form a film or skin coating on the seed that renders them impervious to moisture so that if for any reason the seed should be kept unnecessarily long in the water or aqueous solution, it will not be damaged by water soaking; and I have found that seeds treated with such solutions germinate and sprout more quickly. However, I contemplate the use of other agents or materials to vary the density of the water used in the tanks, and except in those cases where my claims restrict to sugar or other saccharine solutions it is to be understood that I include such other agents within the purview of my invention.

While I have mentioned seeds, my invention extends to the treatment of other materials. Thus, my invention may most advantageously be utilized in the cleaning and separation of the good from the bad or defective, and the grading of potatoes as to size. In the case of potatoes, the basket, as shown in Fig. 5, will be subdivided by horizontal screen-form or perforated partitions, 46, whose mesh or openings are of graduated size, the partition with the largest openings being at the highest level, and the others at lower levels according to the diameter of opening or mesh. Thus, upon the introduction of such a basket with a load of potatoes into a liquid-holding tank, the rotten or defective potatoes will accumulate at the top of the liquid, being lighter than the sound or good potatoes, and by moving the basket up and down with a succession of short jerks, the potatoes will gradually accumulate according to their respective sizes upon the partitions and thus be graded according to size. Upon lifting the basket from the tank, the potatoes in several sizes will rest upon the perforated partitions from which they can be readily removed by dropping the removable front wall to the proper level and then tilting the partition so as to pour or spill out the potatoes thereon for delivery to a suitable bin. A very important advantage from the use of my invention for treating potatoes is that during the cleaning, grading, and separating operation, although they may be in motion or agitated, such occurs when they are in a liquid and hence they are not damaged when striking against one another or other objects. The partitions, 46, and also the basket bottom, are shown in Fig. 5 as hinged in slots, 47, in the basket frame at the front so that they may be readily removed and they may swing either up or down. Pivoted latches, 48, at the rear hold them in horizontal position. A cord, or chain, 46ª, extends from each to the basket top to tilt it. The basket construction shown in Fig. 5 with the grading screens, may be advantageously employed with oranges, apples, and produce or articles other than potatoes.

Various devices may be employed to impart the up and down motion to the basket. I show one such device, it being a horizontal rock shaft, 49, with arms, 50, adapted, when rocked upward, to engage projections on opposite sides of the basket such as a roller, 51, on each side of the basket bail and, after moving upward a short distance, allowed to drop quickly with the basket, this motion being accomplished by a cam, 52, acting on a crank, 53, on the rock shaft. As the basket falls, the basket contents tend to remain behind, from inertia, and then gradually and gently settle, rearranging themselves as they settle. Such a procedure is preferable to the employment of some stirring or other agitating device whose operation might be attended with injury to the basket contents and not so efficient in its action.

Besides sugar for changing the density of water and which I prefer for reasons hereinbefore given, a great variety of other materials may be used, the materials being selected with reference to the effect, harmless or otherwise, they may have upon the articles to be separated. To mention a few others I name salt, honey, glucose, syrup, and water-glass. Again materials may be used that possess insecticide properties, such, for example as blue stone, and chemicals or reagents that promote the growth of beneficent bacteria, such as those which result in the production of nitrogen in the soil in which seed is planted, may be used.

A problem presenting great difficulties in seed separation exists because of the presence in alfalfa and other clover seeds of dodder which differing but little in weight from clover seed makes the separation by winnowing or air blast methods impossible. Some varieties of dodder are slightly heavier than clover seeds, and others are a little lighter than clover seeds. I have found that by using a solution containing potassium salts, such as potassium iodide or potassium carbonate, the solution can be given a density by which 100% separation of clover seed and dodder seed may be effected. In those cases where the clover seed is the heavier, the solution is given a density which will cause the dodder seed to ascend to a higher level, and when the dodder seed is the heavier, the solution is given a density which will cause the ascent of the clover seed. I preferably add sugar to the solution because of the beneficial effects coming from the use of sugar as I have hereinbefore pointed out, and in the case of potassium iodide, because the sugar prevents any harmful effect of the salt on the seed. By using sugar, less quantity of potassium salt is required and that diminishes the cost because sugar is cheaper than the potassium salt. Another advantage coming from the addition of potassium salt is that while the solution is given the required density, it is not thickened or put into a condition which hinders the ready movement of the seeds through the solution, whereas if sugar alone is used in a quantity equal to both the sugar and the potassium salt content, the solution is apt to render the movement of the seeds sluggish. I have successfully used solutions consisting of 13 parts of pure water, 8 parts of sugar, and 4 parts of potassium iodide. With this solution, 100% separation of the good seed from the dodder is effected when the dodder is the heavier. Where the dodder is lighter, the solution can consist of 8 parts of water, 4 parts of sugar, and 2 parts of potassium iodide. My tests have shown that when the dodder is heavier, it will precipitate in a solution of 6 parts of water and 3 parts of potassium carbonate; and when the dodder is lighter it will rise in a solution of 12 parts of water and 4 parts of potassium carbonate. It is to be understood that the proportions I have mentioned need not be strictly followed, but they may be varied from without departure from the scope of my invention. In the practice of my invention the envelopment or immersion of the seeds in the solution is not long enough for the seeds to be injured by the solution, even in those cases where a prolonged stay in the solution might be hurtful and, of course, the seed is quickly and thoroughly washed and dried after the separation thereof from the solution. A solution in which dodder will precipitate will also permit buckhorn, which is heavier than clover seed, to precipitate, and this fact is important because both dodder and buckhorn are usually mixed with clover seed, and hence both can be separated out at one operation. Inasmuch as with the mixture of clover seed and the heavier dodder and buckhorn there will be some seeds lighter than clover seed, such lighter seeds will first be separated by using a solution that will either float the lighter seed and the clover to a higher level than the dodder and buckhorn, or by using a solution in which the clover seed with the dodder and buckhorn will precipitate.

I have found that the stratification of mixtures of all kinds of seed including clover, and seeds lighter than clover, can be produced by an aqueous solution containing any one of such saccharine bodies as glucose, honey, table syrup, sugar, or salt and water-glass, and when the mixture contains buckhorn and dodder, separate stratification of all the varieties of the mixture can be effected by an aqueous solution of potassium iodide or potassium carbonate alone, or with any other or several of the materials just mentioned.

It is, of course, evident that while the form of apparatus shown makes a very excellent embodiment of my invention, yet I do not restrict myself thereto, nor to any particular number of tanks. While the lowering of a basket or mixture container into a tank containing the desired liquid is a very desirable procedure for enveloping the mixture in the liquid, and the lifting of such basket is a very desirable way of effecting the separation of liquid and mixture after the stratification of the components of the mixture, the liquid enveloping and separating operations may be otherwise accomplished, as, for example, by raising and lowering the liquid tank or by flowing the liquid into a tank and then withdrawing the liquid therefrom.

What I claim is:

1. The method of separating mixed bodies of different specific gravity which consists in enveloping the mixture in succession in liquids of graduated density and from time to time removing the layers from one another that are produced by the action of the liquids.

2. The method as claimed in claim 1 when the several liquids are contained in different receptacles.

3. The method as claimed in claim 1 when the separation of the layers is effected in the absence of liquids, the layers at the time of being separated being retained in the disposition thereof that is produced by the liquid.

4. The method of separating mixed bodies of different specific gravity which consists in enveloping the mixture in succession in liquids of graduated density and from time to time removing the layers from one another that are produced by the action of the liquids, the separation being effected by the sidewise removal of the layer that is uppermost.

5. The method as claimed in claim 1 when the liquid contains dissolved saccharine matter.

6. The method as claimed in claim 1 when the mixture is first enveloped in normal water.

7. The method as claimed in claim 1, in which after envelopment in the stratifying liquids the bodies are subjected to the action of a rinsing liquid.

8. The method as claimed in claim 1 in which one of the liquids is a solution of a material that renders the bodies impervious to moisture.

9. A method of separating a mixture of different classes of seeds which comprises the step of stratifying the different classes of seeds in a solution that checks the moisture absorbing power of the seed.

10. A method of separating a mixture of different classes of seeds, comprising the step of stratifying the different classes of seeds in a solution containing saccharine matter.

11. The method of separating a mixture of seeds of different classes which consists in stratifying the different classes in a solution containing saccharine matter and then separating the solution from the stratified seeds without intermingling the different strata.

12. The method of separating a mixture of different classes of seeds which consists in wetting the mixture with water, then stratifying the different classes of seeds in a solution containing saccharine matter, and then separating the solution from the stratified seeds, without intermingling the different strata.

13. The method of separating a mixture of different classes of seeds which consists in stratifying the different classes in a solution containing saccharine matter, then separating the solution from the stratified seeds without intermingling the strata, and washing the strata separately to salvage the solution adhering thereto.

14. The method of separating a mixture of different classes of seeds which consists in wetting the mixture with water, then stratifying the different classes in a solution containing saccharine matter, then separating the solution from the stratified seeds without intermingling the strata, and washing the strata separately to salvage the solution adhering thereto.

15. A method of separating a mixture of different classes of seeds, comprising the step of stratifying the different classes of seeds in a solution containing glucose.

16. The method of separating a mixture of seeds of different classes which consists in stratifying the different classes of seeds in a solution containing glucose and then separating the solution from the stratified seeds without intermingling the different strata.

17. The method of separating a mixture of different classes of seeds which consists in wetting the mixture with water, then stratifying the different classes of seeds in a solution containing glucose, and then separating the solution from the stratified seeds without intermingling the different strata.

18. The method of separating a mixture of different classes of seeds which consists in stratifying the different classes of seeds in a solution containing glucose, then separating the solution from the stratified seeds without intermingling the strata, and washing the strata separately to salvage the solution adhering thereto.

19. The method of separating a mixture of different classes of seeds which consists in wetting the mixture with water, then stratifying the different classes of seeds in a solution containing glucose, then separating the solution from the stratified seeds without intermingling the strata, and washing the strata separately to salvage the solution adhering thereto.

20. The method of separating mixtures of bodies, including seed of different specific gravities which consists in enveloping such mixture in a solution that causes the bodies to occupy different levels according to their respective gravities, said solution containing a material that renders the bodies impervious to moisture, and then removing the bodies of one specific gravity from the bodies of another specific gravity.

21. A classifying apparatus comprising liquids that are respectively of different density and means to hold such liquids separately and means to envelop in such liquids in succession a mixture to be classified into its components and according to the specific gravities of the components.

22. A classifying apparatus comprising means for enveloping a mixture to be classified into its components, according to the specific gravities of the components, in a liquid of a density that will separate the components into different strata and means effecting the separation of the bodies forming one stratum from those forming another without disturbing the stratification produced by the treating liquid.

23. Apparatus as claimed in claim 10 in which the mixture to be treated is contained in a basket that has a vertically slidable side wall.

24. Apparatus as claimed in claim 10 which comprises a liquid holding tank and a mixture holding basket that is vertically movable in such tank.

25. A classifying apparatus comprising liquids of different density, containers for the respective liquids holding them separate, a mixture holding basket that is vertically movable in the liquids within the respective containers, said basket being provided with a plurality of compartments and means effecting the separation of bodies from the mixture formed into one stratum by the liquid from those formed into another stratum without disturbing the stratification of the various bodies produced by the liquids.

26. A classifying apparatus comprising a liquid holding tank and a mixture containing basket having a vertically slidable side wall shiftable to place its upper edge successively at different levels.

27. A classifying apparatus comprising a liquid holding tank and a mixture containing basket having a vertically slidable side wall of transparent material shiftable to place its upper edge successively at different levels.

28. A classifying apparatus comprising a liquid holding tank having a transparent side wall and a mixture holding basket insertible into and removable from such tank and having a transparent side wall.

29. A classifying apparatus comprising a series of liquid holding tanks, a mixture holding basket insertible into and removable from the respective tanks, a tank for receiving one of the classified products having a controllable outlet, and means for transporting the basket from one tank to another.

30. A classifying apparatus comprising a liquid holding tank and a mixture containing basket divided into a plurality of compartments at different levels, the division between adjacent compartments being perforated, and said tank and basket being relatively movable vertically.

In testimony whereof I have signed this specification.

HARRY R. WARREN.